(12) United States Patent  (10) Patent No.: US 8,146,235 B2
Wolter  (45) Date of Patent: Apr. 3, 2012

(54) METHOD OF ALIGNING COMPONENTS FOR INSTALLATION ON A HEAD SUSPENSION ASSEMBLY

(75) Inventor: Raymond R. Wolter, Litchfield, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 846 days.

(21) Appl. No.: 12/211,527

(22) Filed: Sep. 16, 2008

(65) Prior Publication Data
US 2009/0009910 A1 Jan. 8, 2009

Related U.S. Application Data

(62) Division of application No. 11/037,281, filed on Jan. 18, 2005, now Pat. No. 7,441,323.

(51) Int. Cl.
G11B 5/127 (2006.01)
H04R 31/00 (2006.01)

(52) U.S. Cl. ................. 29/603.1; 29/603.03; 29/603.04; 29/603.07; 360/244.8; 360/254.2; 360/245.4; 360/294.4; 360/294.7

(58) Field of Classification Search .. 29/603.03–603.16, 29/603.1; 360/240, 244, 244.2, 244.8, 294.4–294.7, 360/245.2, 245.4
See application file for complete search history.

(56) References Cited

U.S. PATENT DOCUMENTS

| 5,491,597 | A | 2/1996 | Bennin et al. |
| 5,570,249 | A | 10/1996 | Aoyagi et al. |
| 5,892,637 | A | 4/1999 | Brooks et al. |
| 5,920,444 | A | 7/1999 | Heeren et al. |
| 5,986,852 | A | 11/1999 | Berg et al. |
| 6,052,258 | A | 4/2000 | Albrecht et al. |
| 6,055,133 | A | 4/2000 | Albrecht et al. |
| 6,367,144 | B1 | 4/2002 | Holaway et al. |
| 6,381,099 | B1 | 4/2002 | Mei |
| 6,442,828 | B1 * | 9/2002 | Albrecht et al. ........... 29/603.03 |
| 6,625,870 | B1 | 9/2003 | Heeren et al. |
| 6,657,821 | B1 | 12/2003 | Jenneke |

OTHER PUBLICATIONS

Matthew R. Heim, P.E., "Flex Suspension Assembly Design and Performance Advantages for Wireless HGA Interconnects," in *Head/Media Las Vegas '99 Proceedings*, The 15th Annual Head/Media Conference and Exhibition for the Data Storage Professional, Nov. 13-14, 1999, Las Vegas.

"Self-Aligning Suspension to Arm Attachment by Rivets," in *IBM Technical Disclosure Bulletin*, vol. 29, No. 1 Jun. 1986.

* cited by examiner

Primary Examiner — Paul D Kim
(74) Attorney, Agent, or Firm — Faegre Baker Daniels LLP

(57) ABSTRACT

A head suspension for supporting a head slider over a storage media in a dynamic storage device is provided with a head suspension component having a spring metal layer, an electrically conductive layer and a dielectric layer interposed between the metal layer and the electrically conductive layer. A plurality of electrically conductive traces with bond pads are formed in the electrically conductive layer. A feature datum is also formed in the electrically conductive layer on a detachable carrier strip. The feature datum defines a first edge in the electrically conductive layer parallel to an edge of the bond pads.

4 Claims, 13 Drawing Sheets

METHOD OF ALIGNING COMPONENTS FOR INSTALLATION ON A HEAD SUSPENSION ASSEMBLY

REFERENCE TO RELATED APPLICATION

This application is a division of U.S. patent application Ser. No. 11/037,281, filed Jan. 18, 2005 now U.S. Pat. No. 7,441,323, and entitled BOND PAD REGISTRATION FOR DISK DRIVE HEAD SUSPENSIONS, which is hereby incorporated by reference in its entirety.

FIELD OF THE INVENTION

The present invention relates generally to methods and structures for aligning head suspension structures in a disk drive head suspension assembly.

BACKGROUND OF THE INVENTION

Head suspensions for disk storage devices typically include a load beam, a flexure, and a base plate. The load beam typically includes a mounting region at a proximal end of the load beam for mounting the head suspension to an actuator of a disk drive, a rigid region at a distal end of the load beam, and a spring region between the mounting region and the rigid region. The base plate is mounted to the mounting region of the load beam to facilitate the attachment of the head suspension to the actuator. The flexure is positioned at the distal end of the load beam, and typically includes a gimbal region having a slider mounting surface to which a slider having a magnetic read/write head is mounted. The head slider is thereby supported in read/write orientation with respect to a rotating disk. The gimbal region is resiliently moveable with respect to the remainder of the flexure in response to aerodynamic forces acting on the head slider in the presence of an air bearing generated by the rotating disk. The spring force provided by the spring region counteracts the aerodynamic lift force generated by the head slider in the presence of the air bearing and causes the head slider to "fly" over the surface of the disk at a pre-determined height known as the fly height.

In one type of head suspension, the flexure is formed as a separate component and includes a mounting region that is rigidly mounted at the distal end of the load beam using conventional approaches, such as spot welds. In such a flexure, the gimbal region is located distally from the load beam mounting region of the flexure and generally includes a cantilever beam having the slider mounting surface to which the head slider is mounted. A dimple or other load point extends between the load beam and the slider mounting surface of the flexure and is formed in either the load beam or the slider mounting surface of the flexure. The dimple transfers the spring force generated by the spring region of the load beam to the flexure and the head slider to counteract the aerodynamic force generated by the air bearing between the head slider and the rotating disk. In this manner, the dimple acts as a "load point" between the flexure/head slider and the load beam. The dimple also provides clearance between the cantilever beam of the flexure and the load beam, and serves as a point about which the head slider can gimbal in pitch and roll directions in response to fluctuations in the aerodynamic forces generated by the air bearing.

As the number and density of magnetic domains on the rotating disk increase, it becomes increasingly important that the head slider be precisely aligned over the disk to ensure the proper writing and reading of data to and from the magnetic domains. The angular position of the head suspension and the head slider, also known as the static attitude, is calibrated so that when the disk drive is in operation the head slider assumes an optimal orientation at the fly height. It is therefore important that the static attitude of the head suspension and head slider be properly established. Toward this end, the head slider must be properly positioned on the flexure with respect to the dimple. Misalignments between the dimple and the head slider may cause a torque to be exerted on the head slider, and thus affect the fly height of the head slider and the orientation of the head slider at the fly height. Moreover, improper fly height and angular positioning of the head slider over the disk could result in the head slider "crashing" into the disk surface as the head slider gimbals due to the close proximity of the head slider to the rotating disk at the fly height.

Electrical interconnection between the read/write heads on the head slider and circuitry in the disk storage device is provided along the length of the head suspension. Conventionally, one or more conductive copper traces are bonded to the stainless steel load beam with a dielectric adhesive or are otherwise formed on the load beam, to provide electrical interconnection. Such an integrated lead or wireless head suspension may include one or more bond pads at the distal end of the traces to which terminals on the head slider are electrically connected. Misalignment between the head slider (and therefore the terminals on the head slider) and the bond pads of the traces may compromise the integrity of the electrical interconnection between the head slider and the electrical circuitry in the disk storage device. Therefore, in addition to being properly positioned on the flexure to promote desirable properties such as fly height and static attitudes, the head slider must also be aligned on the flexure relative to the bond pads to ensure a high quality interconnection between the bond pads and the terminals of the head slider.

The traces and bond pads may also be configured to provide desired mechanical connection and support to the gimbal region of the load beam. In one approach, described in U.S. Pat. No. 5,491,597 (Bennin, et al.) the traces include one or more symmetrical torsional arms extending from the load beam. Adjacent arms are shaped as back to back "P"s, with a semicircular indentation approximately at the middle of each back. The indentation defines a round clearance hole that fits around and receives the gimbal pivot (e.g., dimple). This allows the head assembly to swivel on the gimbal pivot.

To assist in the alignment of the head suspension components and in the formation of head suspension features, the head suspension typically includes reference apertures or tooling holes that are engaged by an alignment tool. The apertures are typically longitudinally spaced apart and are formed in the rigid region of the load beam. In head suspensions that include a separate flexure mounted to the load beam, the flexure can include corresponding apertures formed in the load beam mounting region of the flexure. The reference apertures in the load beam and the flexure are typically circular, and are sized and positioned so as to be substantially concentric when the flexure is mounted to the load beam.

Rigid cylindrical pins on an alignment tool are typically used to align the individual head suspension components. The rigid pins are spaced apart an amount equal to the longitudinal spacing between the reference apertures in the components. The pins are inserted into and engage the apertures in the load beam and flexure, and in this manner concentrically align the apertures, and thus the load beam and the flexure, to one another. A similar method may be used to install the head slider to the slider mounting surface of the gimbal region of the flexure.

According to one approach described in U.S. Pat. No. 6,657,821 (Jenneke), a reference aperture is provided with a compliant feature configured to receive a tapered cylindrical pin for precisely locating a head suspension component relative to a desired reference. A spring beam tab of the compliant feature is engaged by the tapered pin to reliably locate the pin within the reference aperture. In an approach illustrated in U.S. Pat. No. 5,570,249 (Aoyagi et al.), rather than being circular, a distal aperture in the load beam is elongated and generally elliptical. The aperture includes a "v" shaped portion at one end. According to another approach described in U.S. Pat. No. 6,625,870 (Heeren et al.), an elongated alignment aperture is formed in a rigid region of a load beam, and a proximal alignment aperture and a distal alignment aperture are formed in the flexure. The elongated aperture overlaps at least a portion of the proximal and distal alignment apertures. Once aligned, the components can then be fastened together, as by welding or other known processes.

FIG. 1 is an illustration of a portion of a prior art head suspension assembly 10. Head suspension 10 was used to support and properly orient a head slider over a rotating disk (not shown) in a magnetic disk storage device. Head suspension 10 was comprised of a load beam 12 coupled at a proximal end to an actuator arm (not shown). A stainless steel flexure 14 was mounted to a distal end of the load beam 12. The flexure 14 was attached to a carrier portion or strip 16 detachable from the remainder of the flexure 14 at line 18. Flexure 14 was formed with a gimbal region 20 having a slider mounting surface 22 for receiving a head slider 24 (shown partially cut away) having electrical terminals 26. Integrated leads 28 were formed on flexure 14 to provide electrical interconnection between the electrical terminals 26 of the head slider 24 and circuitry in the magnetic disk storage device to which the head suspension 10 was mounted. Integrated leads 28 included one or more conductive traces 30 that provided such electrical interconnection. The traces 30 terminated in a plurality of bond pads 32 on the slider mounting surface 22 at the gimbal region 20 of the flexure 14. The bond pads 32 were formed in a layer of copper separated from the stainless steel of the flexure 14 by a layer of dielectric material interposed therebetween.

The head suspension 10 included a circular aperture 34 extending through the flexure 14 at the carrier strip 16. The aperture 34 was formed in a copper layer. That is, the aperture 34 included an opening in the stainless steel of the flexure 14 and an opening in a copper region formed on the stainless steel. The opening through the stainless steel was larger than the opening in the copper so that the edges of the aperture 34 were defined by copper. The aperture 34 was engageable by a tooling pin as described previously for assisting alignment of the bond pads 32 of the traces 30 to the load beam 12 and dimple 183, thus assisting in the accuracy of the placement of the slider 24 in subsequent procedures.

There are various deficiencies and shortcomings associated with prior art head suspensions and tooling. Conventional reference apertures such as those described above include manufacturing tolerances that affect the interface between the alignment tool and the head suspension component. The pins on the alignment tools also include manufacturing and positioning tolerances. These tolerances are cumulative so as to affect the alignment of individual head suspension components, and affect the forming of head suspension features, such as the load point dimple, and mounting of the head slider to the flexure. In addition, when aligning individual head suspension components, the manufacturing tolerances in the apertures of the load beam and the flexure are "stacked" together because the head suspension components are engaged by common alignment pins, thus creating additional alignment problems.

A drawback to these prior art approaches is that the tooling pin is typically aligned to a reference feature (i.e. the reference or alignment aperture) formed in a stainless steel region of the load beam or flexure. When aligning a component such as the head slider to the bond pads, one must assume that the registration of the stainless steel layer of the reference aperture is perfect with respect to the copper layer of the bond pads. However, perfect alignment between the stainless steel layer and the copper layer is not typical.

The traces and bond pads are often formed on the load beam through etching (subtractive) or deposition (additive) processes. Conventional etching processes make use of a laminate including a dielectric layer between stainless steel and copper layers. Using known photolithography and etching processes, regions of the copper layer are subjected to etching or corrosive chemicals, which etch or remove the copper to form specific features, for example, traces and bond pads. The mass of these formed copper components is inversely related to the length of time the copper is subjected to etching chemicals. Thus, as the copper components are subject to the etching process, areas of copper mass become smaller and openings or apertures in areas of copper become larger. Small variations in processing, including etching time, can sometimes lead to variations in the size and location of the copper components, including the traces and bond pads. Such variations can result in misalignment of the electrical terminals of the head slider to the bond pads.

For example, it is possible for the head slider to be positioned on the flexure so as to promote certain properties, such as fly height and static attitude, yet be mis-aligned relative to the bond pads due to bond pad positional variation so as to form none or a low quality electrical interconnection. Conversely, the terminals of the head slider may be adequately aligned to the bond pads to form a high quality interconnection, yet because of positional variation of the bond pads, the position of the head slider on the flexure adversely effects such characteristics as fly height of the head slider and static attitude of the head suspension assembly.

There is, therefore, a continuing need for an improved method and structure for aligning individual head suspension components, for aligning the head slider to the bond pads on the flexure and for establishing the proper static attitude of the head suspension assembly.

SUMMARY OF THE INVENTION

According to one embodiment, the present invention is a head suspension for supporting a head slider over a storage media in a dynamic storage device. The head suspension comprises a head suspension component having a spring metal layer, an electrically conductive layer and a dielectric layer interposed between the metal layer and the electrically conductive layer. A plurality of electrically conductive traces with bond pads and a datum feature are formed in the electrically conductive layer. The datum feature is a circular aperture in the electrically conductive layer. According to another embodiment, the datum feature is a v-shaped aperture in the electrically conductive layer. According to yet another embodiment, the datum feature is an aperture defining a first edge in the electrically conductive layer. The bond pads define a second edge in the electrically conductive layer. The first edge is parallel to the second edge.

According to another embodiment, the present invention is a head suspension for supporting a head slider over a storage media in a dynamic storage device. The head suspension comprises a head suspension component having a spring metal layer, an electrically conductive layer and a dielectric layer interposed between the metal layer and the electrically conductive layer. A plurality of electrically conductive traces with bond pads are formed in the electrically conductive layer, and a datum feature is formed in the electrically conductive layer and defined by the bond pads.

According to another embodiment, the present invention is a method of aligning components for installation on a head suspension assembly for supporting a head slider over a storage media in a dynamic storage device. The head suspension assembly having a spring metal layer, an electrically conductive layer, and a dielectric layer interposed between the metal layer and the electrically conductive layer. A plurality of electrically conductive traces terminate in bond pads in the electrically conductive layer. The method includes the step of forming a datum feature in the electrically conductive layer. The datum feature has a first edge parallel to an edge of the bond pads. The electrically conductive layer is subjected to etching chemicals so that the bond pad edge migrates towards the datum feature first edge and the datum feature first edge migrates away from the bond pad edge at an equal rate. A head slider is aligned to the datum feature so that the head slider is aligned to the bond pad edge. The head slider is installed to the head suspension assembly in electrical interconnection with the bond pads.

According to another embodiment, the present invention is a method of manufacturing a head suspension assembly for supporting a head slider over a storage media in a dynamic storage device. The head suspension assembly is of the type having a spring metal layer, an electrically conductive layer, and a dielectric layer interposed between the metal layer and the electrically conductive layer, and a plurality of traces formed in the electrically conductive layer and terminating in bond pads adjacent a slider mounting surface. The method includes the steps of forming a datum feature in the electrically conductive layer adjacent to the bond pads and spaced apart from the slider mounting surface. A head slider is installed at the slider mounting surface. The coordinates of the head slider relative to the datum feature is determined. The head suspension assembly is discarded if the coordinates of the head slider are not within preset ranges.

DETAILED DESCRIPTION OF THE PREFERRED EMBODIMENTS

Figure 2:
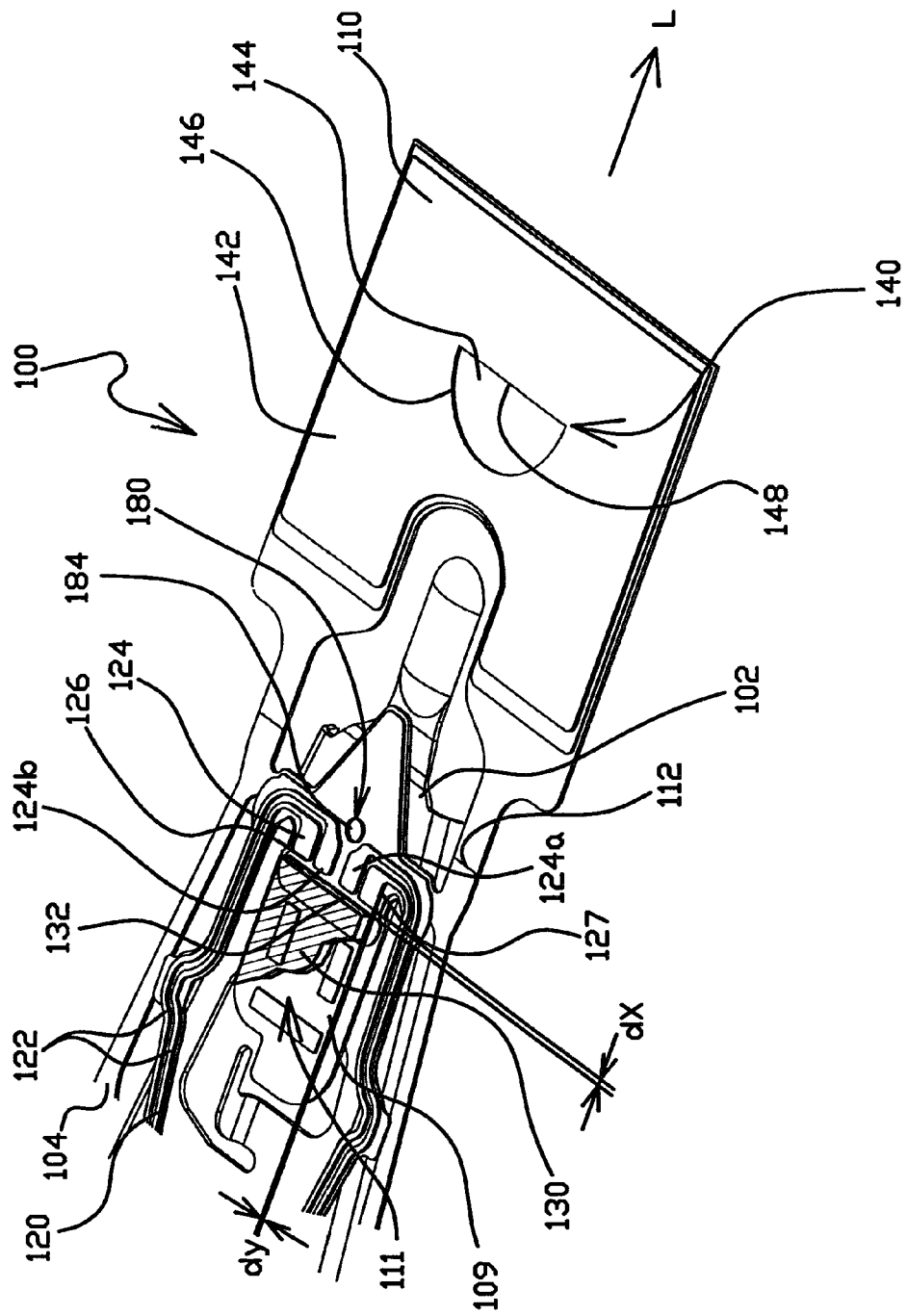
FIG. 2 is a perspective view of a portion of a head suspension assembly including a flexure and load beam according to one embodiment of the present invention.

FIG. 2 is an illustration of a portion of a head suspension assembly 100 according to one embodiment of the present invention. Head suspension 100 includes a load beam 102 and a flexure 104 mounted to the load beam 102. The flexure 104 includes a detachable carrier portion or strip 110 separable from the remainder of the flexure 104 at line 112. Flexure 104 is formed with a gimbal region 109 having a slider mounting surface 111 for receiving a head slider 130 (shown partially cut away) having electrical terminals 132. Integrated leads 120 are formed in a copper layer of the flexure 104 and are separated from a stainless steel layer of the flexure 104 by a layer of dielectric material interposed therebetween. Integrated leads 120 include one or more conductive traces 122 terminating in bond pads 124 on the slider mounting surface 111 at the gimbal region 109 of the flexure 104. The bond pads 124 are provided with a bond pad edge 126 in the copper layer towards the proximal end of the flexure 104. The edge 126 of the bond pad 124 is generally perpendicular to a longitudinal axis L of the flexure 104.

Head suspension assembly 100 further includes an alignment structure 140 formed in the copper layer of the flexure 104. Alignment structure 140 forms a tooling datum to facilitate alignment of the flexure 104, or components of the flexure 104, to other components of the head suspension assembly 100 during construction of the head suspension assembly 100. The alignment structure 140 includes an aperture 144 extending through a copper region 142 of the carrier strip 110 of the flexure 104. Aperture 144 extends through both the stainless steel layer and the copper layer of the flexure 104. However, the opening in the stainless steel layer is larger than the opening in the copper layer such that the edges of the aperture 144 are defined by the copper layer. The aperture 144 has a curved segment or edge 146 towards the proximal end of the flexure 104 and a straight segment or edge 148 towards the distal end of the flexure 104 forming a half-moon shape. Aperture 144 is positioned on the flexure 104 so that edge 148 is parallel to the edges 126 of the bond pads 124.

Figure 3:
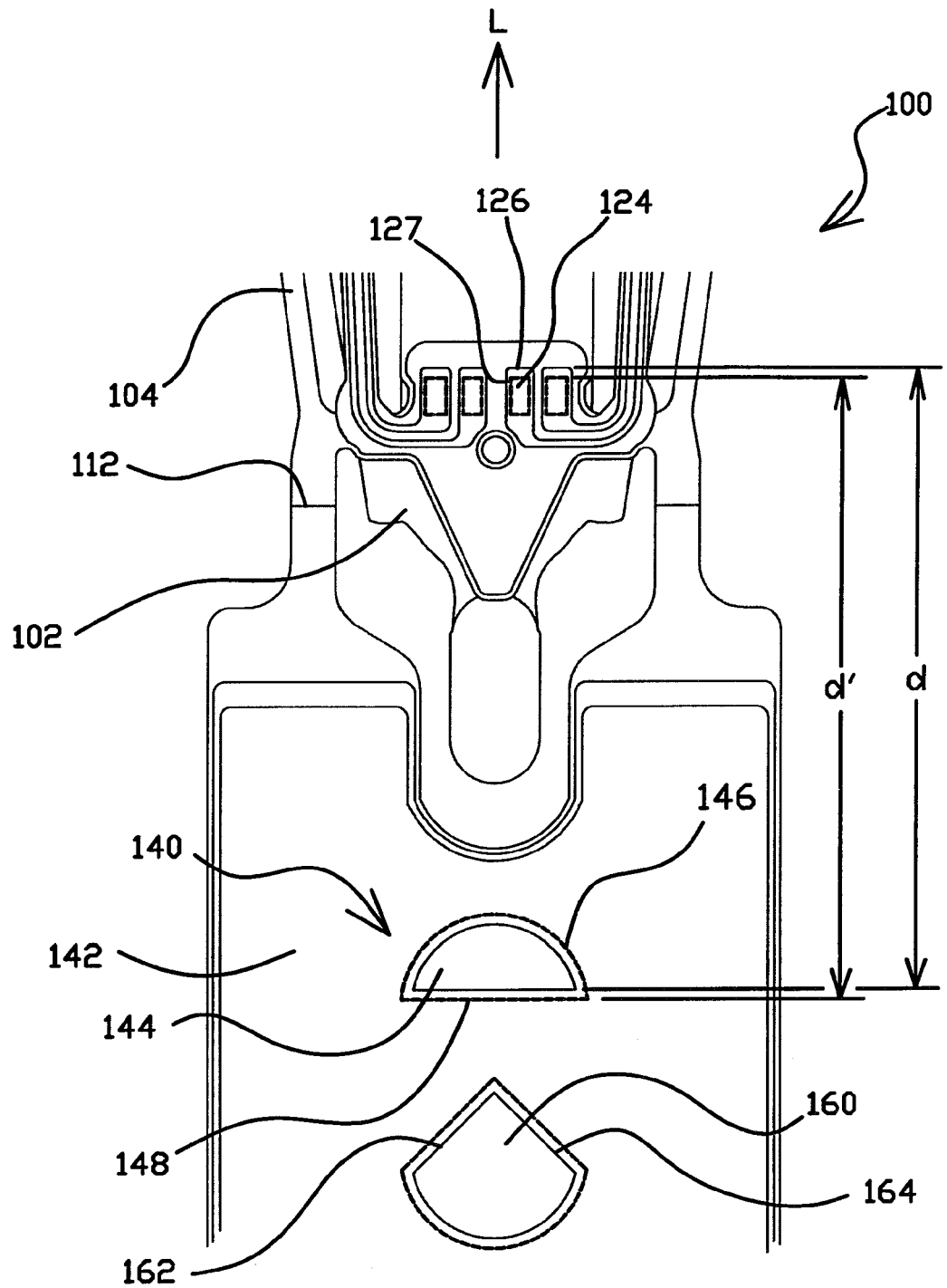
FIG. 3 is a detailed top view of a portion of the flexure of FIG. 2 at first and second stages in the copper layer formation process.

FIG. 3 illustrates a portion of the flexure 104 and load beam 102, including the bond pads 124 and the alignment structure 140, at two different stages in the aforementioned etching process. The solid lines represent the copper edges of the alignment structure 140 and bond pads 124 at a first stage in the etching process. The dashed lines represent the copper edges of the alignment structure 140 and bond pads 124 at a second stage in the etching process, after a period of further exposure to etching chemicals. As described previously, throughout the etching process, masses of copper, such as bond pads 124, decrease in size as the copper edges of such masses are etched away. Bond pad 124 is configured such that edge 126 etches or migrates through out the etching process towards the distal end of the flexure 104. Edge 126 is generally perpendicular to the longitudinal axis L of the flexure 104, such that edge 126 migrates or retracts substantially entirely along the longitudinal axis L without any lateral migration. As also described previously, throughout the etching process, voids in the copper layer, such as aperture 144, increase in size as the copper edges of such voids etch away. In the present example, aperture 144 is configured such that edge 148 etches distally, away from the edges 126 of the bond pads 124. Edge 148 is parallel to edge 126 of the bond pads 124, such that edge 148 also retracts substantially entirely along the longitudinal axis L.

The rate of etching is generally the same for both the bond pads 124 and aperture 144, such that migration along the axis L is substantially the same for the bond pad edge 126 and the aperture edge 148. A distance d between the edges 126 of the bond pads 124 and the edge 148 of the aperture 144 at the first stage of the etching process is the same as a distance d' between the edges 126 of the bond pads 124 and the edge 148 of the aperture 144 at a second stage in the etching process. Generally, the distance d remains the same throughout the etching process. The position of the alignment feature 140 tracks the location of the bond pad edges 126 throughout the etching process. Any variations in the location of the bond pad edge 126 due to variations in the etching process (i.e. over or under etching) are tracked by the alignment feature 140. The alignment feature 140 is more accurately positioned on the flexure 104 relative to the bond pads 124. If, as described previously, the aperture 144 is engaged by a tooling pin to facilitate installation of the head slider 130 to the flexure 104, the tooling pin and thus the head slider 130 will be more accurately positioned on the flexure 104 relative to the bond pads 124. This increases the likelihood of forming a high quality electrical interconnection between the terminals 132 of the head slider 130 and the bond pads 124 of the traces 122 despite etching related positional variations of the bond pads 124.

Figure 1:
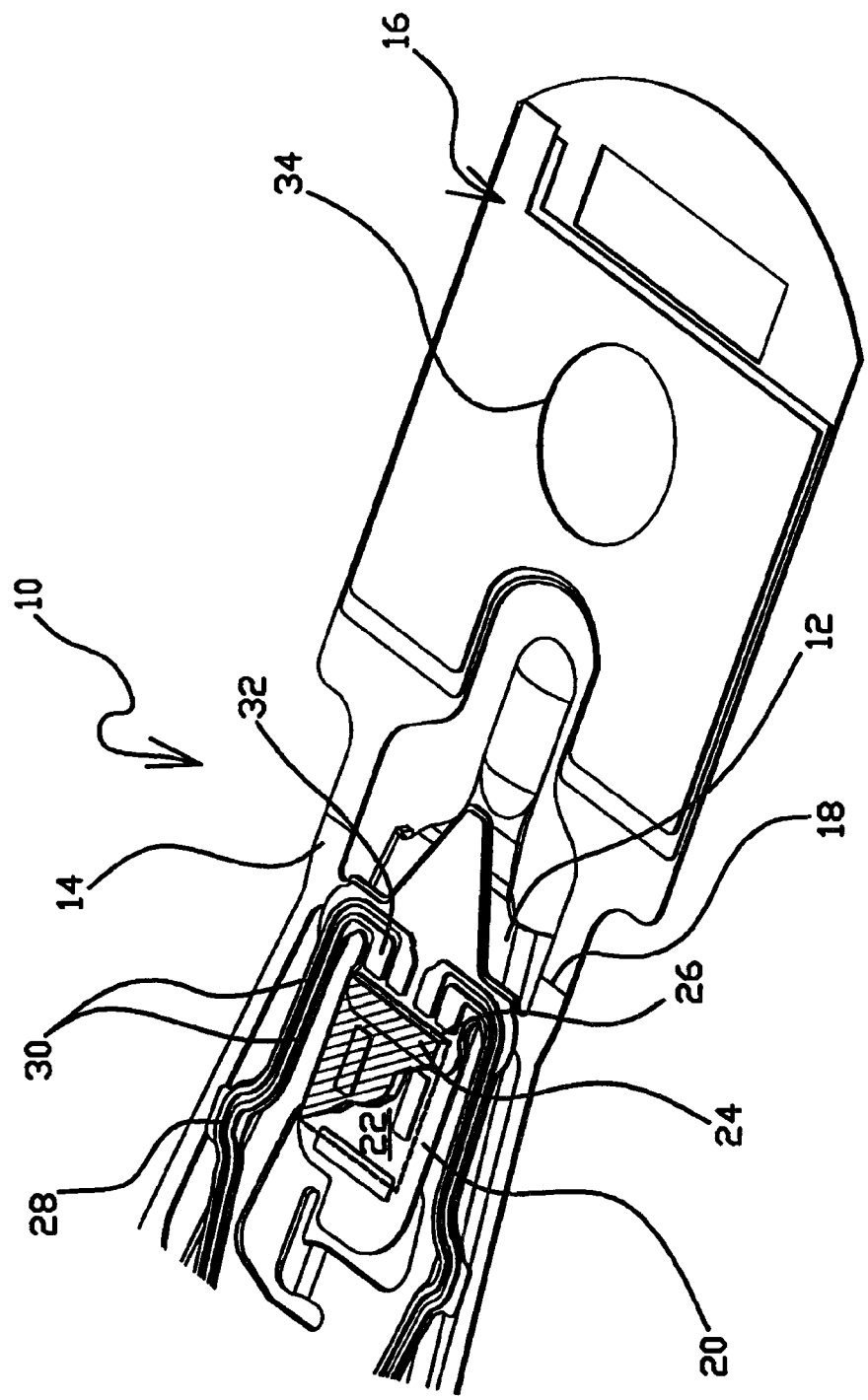
FIG. 1 is a perspective view of a portion of a prior art head suspension assembly.

Typically, variations in bond pad positioning resulted in misalignment of other installed components such as the head slider 130 with respect to the bond pads 124. A reference aperture placed in the same layer as the bond pads, as described with respect to prior art FIG. 1, does not compensate for bond pad positional variation. A head suspension assembly 100 according to the present embodiment, however, is configured to reduce misalignment of the alignment feature 140 to the bond pads 124 despite etching-induced variations in the position of the bond pads 124. In particular, the edge 148 of the aperture 144 tracks the edges 126 of the bond pads 124. The alignment feature 140 is advantageously effectively continuously self-aligned to the edges 126 of the bond pads 124 throughout the manufacturing process. A tooling pin or other alignment tools employing the alignment feature 140 will be more accurately aligned to the edges 126 of the bond pads 124. Head suspension components, including the head slider 130, can therefore be more consistently mounted to the gimbal region 109 in accurate alignment with the bond pads 124 despite variances in location of the bond pads 124 due to variances in the copper etching processes.

Alignment feature 140 is optionally further comprised of a second aperture 160 in the copper region 142 of the carrier strip 110. In one embodiment, second aperture 160 has tapered edges 162, 164 and is generally V-shaped. A second tooling pin coupled to the reference pin engages the second aperture 160. The second pin is used to push or pull the flexure 104 to bring the reference pin to a consistent location in the aperture 144. According to one embodiment, a second pin engages the second aperture 160 and is used to push or pull the reference pin to engage the straight edge 148 of the aperture 144. The addition of the second alignment aperture 160 allows the reference pin to be consistently located with respect to the alignment structure 140. Optionally, second aperture 160 may be located in another layer of the flexure 104, may take another shape, or may be used for installing other components onto the head suspension assembly 100.

Returning to FIG. 2, the head slider 130 can be mounted to the flexure 104 so that bond pads 124 are electrically interconnected to terminals 132 on the head slider 130 using conventional techniques, such as ultrasonic welding or solder balls. During installation of the slider 130, the terminals 132 must be precisely aligned with the bond pads 124 to provide a good electrical interconnection. In particular, the slider 130 must be installed on the head suspension assembly 100 so that the longitudinal distance dx along a longitudinal axis L of the head suspension assembly 100 between the terminals 132 and the edges 126 of the bond pads 124 are from about 5 μm to about 50 μm. Preferably, the longitudinal distance dx between the terminals 132 of the mounted head slider 130 and the edges 126 is less than about 20 μm.

As shown in FIG. 3, the bond pads 124 also etch along side edges 127. A lateral misalignment of the terminals 132 with respect to a side edge 127 of the bond pads 124 may also reduce the quality of the electrical interconnection between the terminals 132 and the bond pads 124. Therefore, it is contemplated that the alignment feature 140 may also include an edge angled or parallel to the side edges 127 of the bond pads 124. In this manner, the alignment feature 140 may be configured to track lateral migration of the bond pads 124 as well as longitudinal migration.

It is also contemplated that the alignment feature 140 be positioned on the head suspension assembly 100 elsewhere than the carrier strip 110. For example, the alignment feature 140 may be located on the load beam 102 or the flexure 104.

Figure 4:
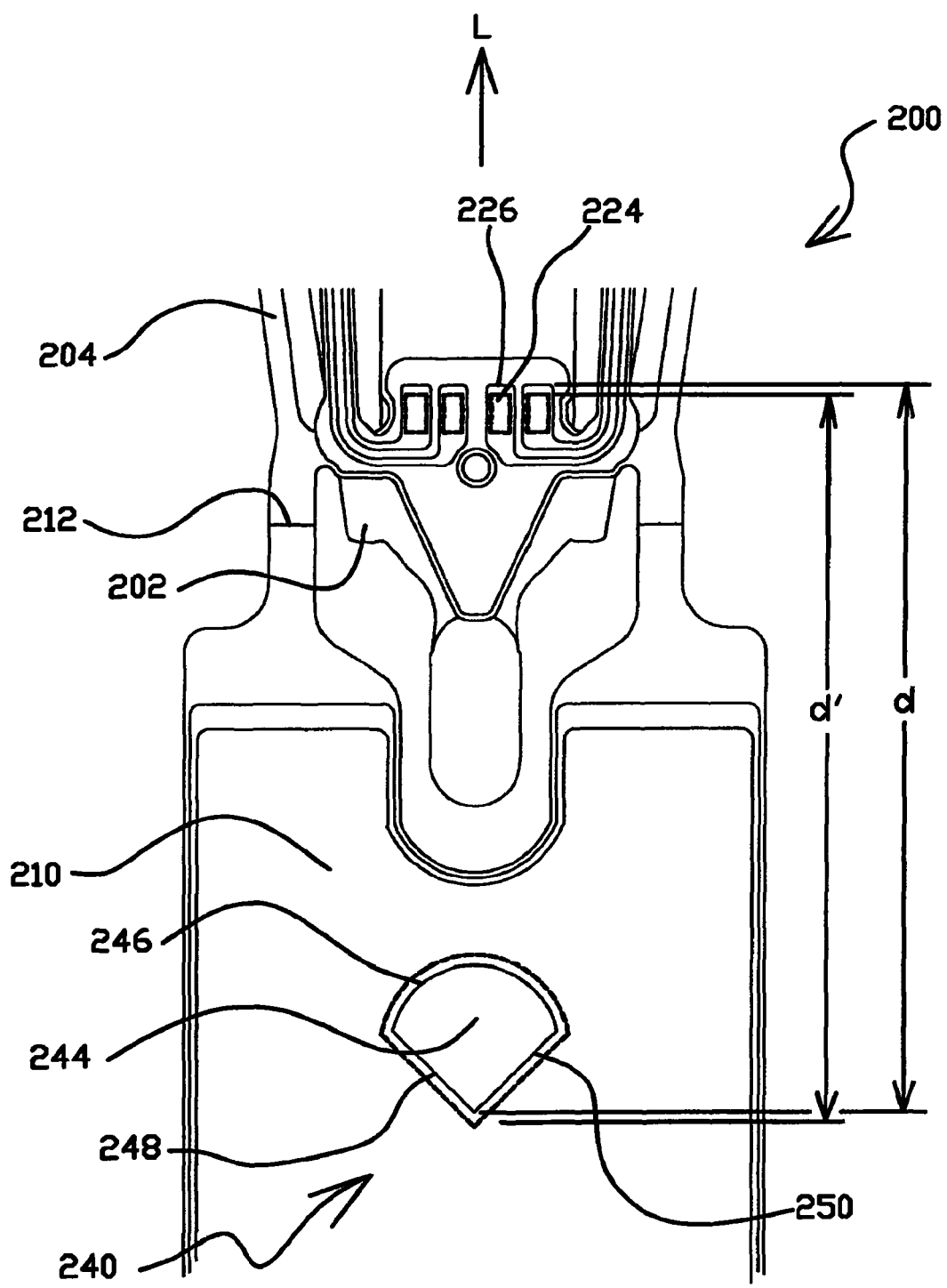
FIG. 4 is a perspective view of a portion of a flexure and load beam according to another embodiment of the present invention at first and second stages in the copper layer formation process.

FIG. 4 shows a portion of a head suspension assembly 200 according to another embodiment of the present invention at two stages in a copper etching process. The head suspension assembly 200 includes a load beam 202, flexure 204 and bond pads 224 configured as generally described with reference to FIG. 2. The bond pads 224 are provided with an edge 226 in the copper layer of the flexure 204 extending generally perpendicular to a longitudinal axis L of the flexure 204 as previously described. Head suspension assembly 200 further includes an alignment structure 240 positioned on a carrier strip 210 separable from the flexure 204 at a line 212. The alignment structure 240 includes a generally V-shaped aperture 244 extending through a copper region 242 of the carrier strip 210. The aperture 244 is comprised of a curved edge or segment 246 interposed between first and second opposing angled edges or segments 248 and 250 opening towards the proximal end of the flexure 204. Angled edges 248, 250 are preferably positioned at approximately 45° and 135° degrees, respectively, with respect to the edge 226 of the bond pads 224. Such a configuration provides equal weight to both the longitudinal axis L and a perpendicular lateral axis. Aperture 244 extends through both the stainless steel layer and the copper layer of the flexure 204. The opening in the stainless steel layer is larger than the opening in the copper layer such that the edges 246, 248 and 250 of the aperture 244 are defined by the copper layer.

The solid lines represent the edges of the alignment structure 240 and bond pads 224 at a first stage in the etching process. The dashed lines represent the edges of the alignment structure 240 and bond pads 224 at a second stage in the etching process, after a period of further exposure to etching chemicals. As described previously, throughout the etching process the size of the aperture 244 continues to increase while the size of the bond pads 224 continues to decrease. This includes the edges 226 of the bond pads 224 retracting or migrating along the axis L. The edges 248 and 250 of the aperture 244 migrate or retract at opposing angles relative to the axis L. This angular migration includes some migration along the axis L in the same direction as the migration of the edges 226 of the bond pads 224. The amount of migration along the axis L relative to the migration of the edges 226 of the bond pads 224 is in part dependent upon the angle of the edges 248 and 250 relative to the edges 226 of the bond pads 224.

Throughout the etching process the position of the alignment structure 240 migrates partially in the same direction as the edges 226 of the bond pads 224. Thus, the alignment feature 240 is more accurately aligned to the bond pads 224 for facilitating alignment of a head slider (not shown) to the bond pads 224.

While the head slider 130 may be properly aligned with the bond pads 124 to provide a good electrical connection, the actual location of the head slider 130 on the gimbal region 109 should also be such as to promote proper static attitudes of the head suspension assembly 100. Generally, the head slider 130 needs to be aligned in a given or specified location, i.e. in the X and Y axes, as well as a rotating axis, with respect to another component, typically the load beam 102, and more specifically a dimple or load point 183 formed between the flexure 104 and the load beam 102. This alignment is desirable to achieve optimum positioning and fly height of the head slider 130 during operation.

For this reason, it is often desirable to determine the position of the head slider 130 on the flexure 104 relative to a feature of interest on the flexure 104, for example, the load point 183. One method of doing so is to determine the location of the edges 126 of the bond pads 124 relative to the load point 183. As the head slider 130 must be aligned to the edges 126 to form a good electrical interconnection, the location of the head slider 130 can be inferred from the location of the edges 126. However, the installed head slider 130 typically obscures the edges 126 of the bond pads 124. Furthermore, the installed head slider 130 typically obscures the load point 183.

Returning to FIG. 2, the head suspension assembly 100 optionally includes a feature datum 180 for determining the location of the head slider 130 relative to the load point 183 in accordance with one embodiment of the present invention. The feature datum 180 is positioned at a predetermined location relative to the load point 183 and to the edges 126 of the bond pads 124. Following installation of the head slider 130, the position of head slider 130 relative to the feature datum 180 is measured and used to infer the position of the head slider 130 relative to the load point 183. If the head slider 130 is positioned incorrectly relative to the load point 183, even though properly aligned to the bond pads 124, the part may be rejected.

The feature datum 180 includes a circular aperture 182 in a copper region 184 positioned equidistant between adjacent bond pads 124a and 124b. The aperture 182 includes an opening through the stainless steel of the flexure 104 and an opening through the copper region 184 formed on the flexure 104. The opening through the stainless steel is larger than the opening through the copper region 184 such that the edges of the aperture 182 are defined by copper. The feature datum 180 remains visible following installation of the head slider 130 to the slider mounting surface 111.

Feature datum 180 provides a convenient reference point for taking measurements for determining the location of the head slider 130 relative to the load point 183. The edges of the aperture 182 are optically readable by vision scanning devices to determine their coordinates. The positional relationship between the feature datum 180 and the load point 183 is pre-determined, such that the location of the head slider 130 on the flexure 104 relative to the load point 183 can easily be determined.

Feature datum 180 is preferably formed in the same copper layer as the bond pads 124 as described above. Doing so reduces tolerance stack ups in the same manner as described with respect to the alignment features or tooling datums previously described with respect to the embodiments shown generally in FIGS. 2-4. Feature datum 180 and bond pads 124, and thus head slider 130, will track in position together regardless of any differential in registration between the copper layer and the stainless steel layer.

According to another embodiment, the feature datum 180 serves as a reference point for determining the location of the head slider 130 on the flexure 104 independent of the load point 183. For example, the feature datum 180 may be used to facilitate determining the coordinates of the installed head slider 130. If the actual coordinates of the head slider 130 are not within pre-determined limits, the part may be rejected.

Figure 5A:
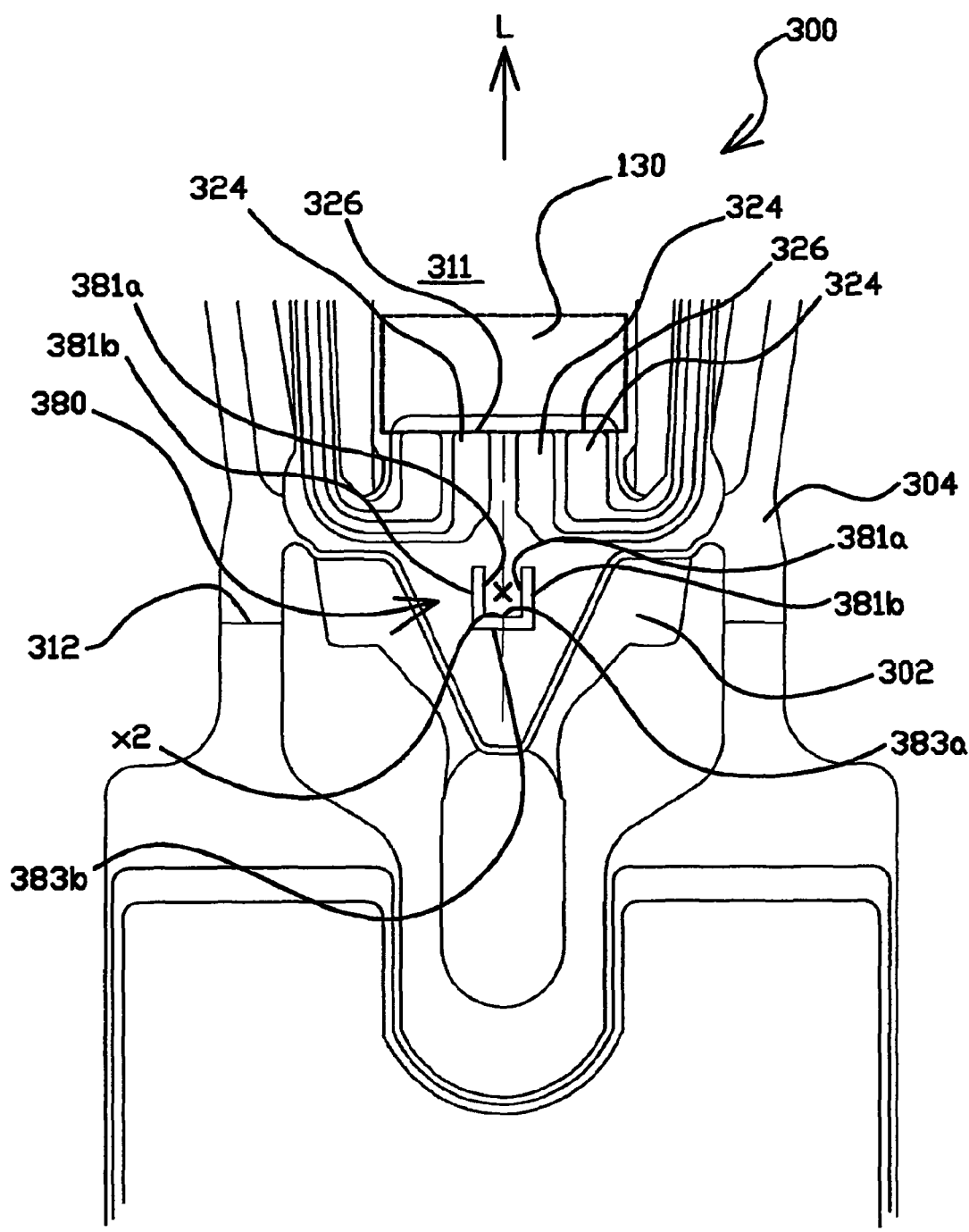
FIG. 5A is a detailed top view of a portion of a flexure and load beam showing a feature datum according to yet another embodiment of the present invention.

FIG. 5A illustrates a portion of a head suspension assembly 300 according to another embodiment of the present invention. Head suspension assembly 300 is in many respects similar to the head suspension assembly 100 of FIG. 2, so that like parts are given like numbering, although numbered from 300 onward. The head suspension assembly 300 includes a load beam 302, flexure 304, integrated leads 320 and bond pads 324 configured as generally described with reference to FIG. 2. The head suspension 300 further includes a feature datum 380. The feature datum 380 is a copper component formed on the flexure 304 and spaced apart from the bond pads 324. The feature datum 380 is positioned on the flexure 304 such that it remains visible following installation of other components, for example, the head slider 130. The feature datum 380 is generally U-shaped and is positioned on the flexure 304 such that an open side of the feature datum 380 faces the bond pads 324. Feature datum 380 defines a pair of parallel inner side edges 381a and a perpendicularly-extending inner back edge 383a. In one embodiment, the inner back edge 383a is generally parallel to an edge 326 of the bond pads 324.

Figure 5B:
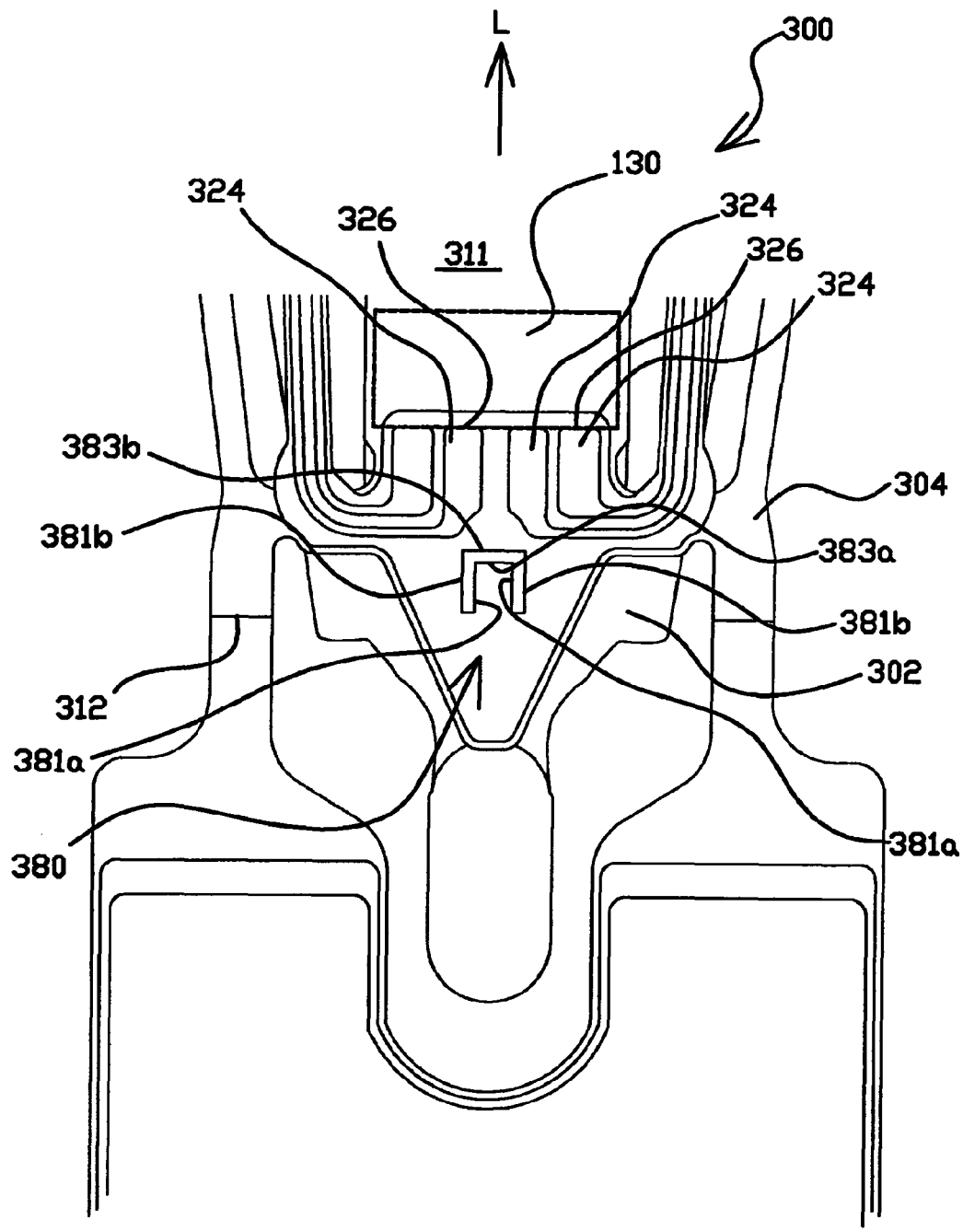
FIG. 5B is a detailed top view of a portion of a flexure and load beam showing the feature datum of FIG. 5A in a reverse configuration according to yet another embodiment of the present invention.

Feature datum 380 may be used to generate a convenient reference point for determining the location of head suspension components, for example, the head slider 130. According to one embodiment, vision scanning devices are used to identify the side edges 381a and back edge 383a. A representative reference point is generated at a location equidistant from the inner side edges 381a and the inner back edge 383a, as shown by the numeral X. Alternately, a mid-line is generated between the inner side edges 381a (shown in dashed line) and a reference point is generated at the intersection of the mid-line and the inner back edge 383a (shown as numeral X2). According to other embodiments, reference may be taken from outer side edges 381b and outer back edge 383b rather than the inner edges, although in a similar manner. Alternately, as shown in FIG. 5B, the feature datum 380 may be positioned to face away from the bond pads 324. Again, either the inner or outer edges of the feature datum 380 may be used to generate a reference point.

Rather than generating a representative reference point based upon the location of the feature datum 380, an edge of the feature datum 380 can be compared to, for example, an edge of the bond pads 324. Along the axis L, the position of the bond pads 324 can be determined as the distance between the edge 326 of the bond pads 324 and the edge 383a of the feature datum 380. With respect to a lateral or perpendicular axis of the head suspension assembly 300, the lateral distance the edge 381a of the feature datum 380 and a longitudinally extending edge 327 of the bond pad 324 can be determined. As described previously, because both the bond pads 324 and the feature datum 380 are formed in the copper layer, the position of the feature datum 380 with respect to the bond pads 324 is independent of any mis-registration of the stainless steel and copper layers, and positional variances of the bond pads 324 due to under- or over-etching of the copper layer are likewise repeated in the feature datum 380.

Figure 5C:
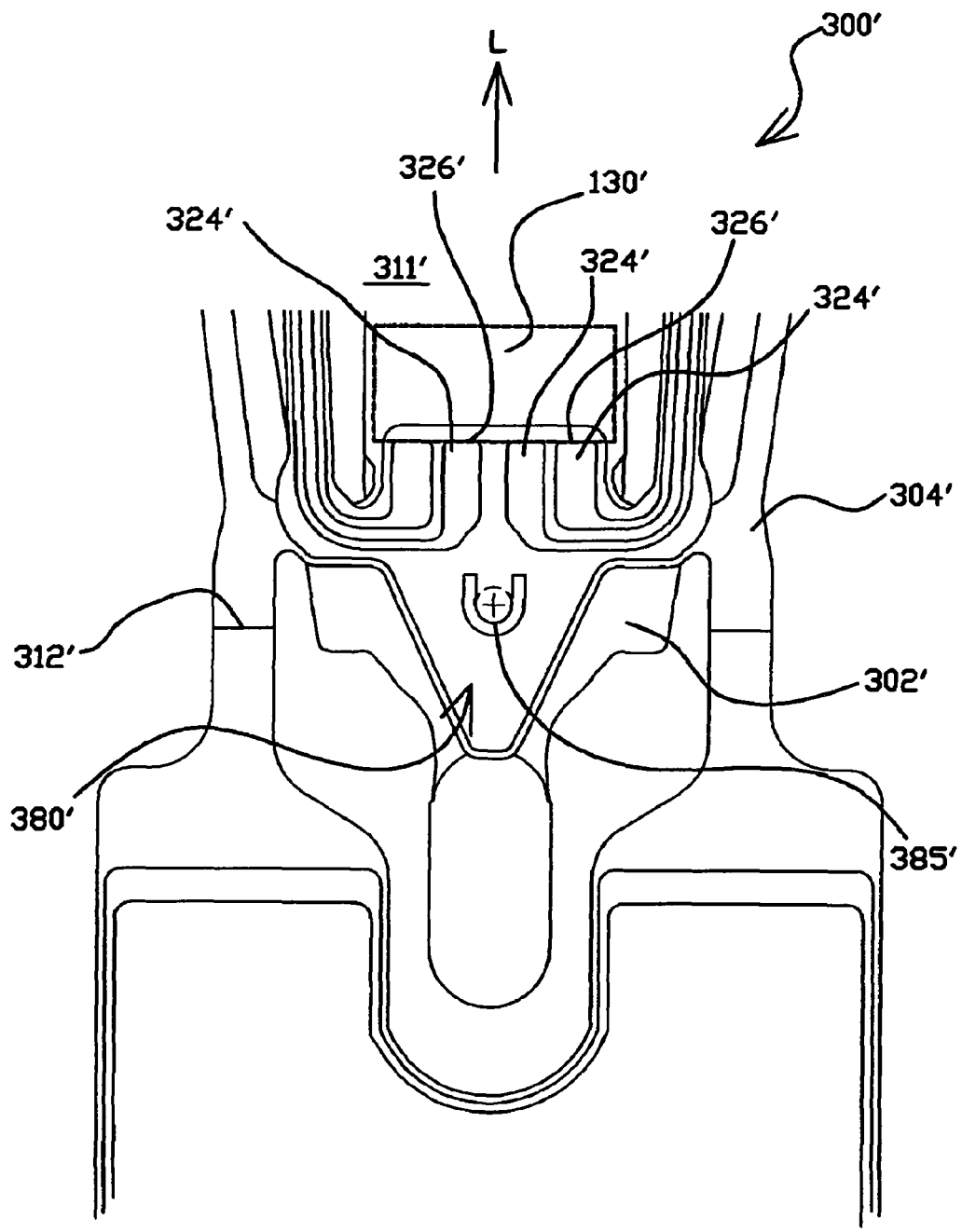
FIG. 5C is a detailed top view of a portion of a flexure and load beam showing a feature datum according to yet another embodiment of the present invention.

FIG. 5C shows a head suspension assembly 300' in accordance with another embodiment of the present invention. Head suspension assembly 300' is in many respects similar to the head suspension assembly 300 of FIGS. 5A and 5B, so that like parts are given like numbering, with the addition of a prime indicator. The feature datum 380' of head suspension assembly 300' is U-shaped as described with respect to the feature datum of FIGS. 5A and 5B, but has curved or circular edges. An inner edge 385' of the feature datum 380' has a circular profile and forms a portion of a circle, shown in dashed lines. Optical scanners as are known in the art may be employed to read the edge 385' of the feature datum 380' and calculate the center of the circle, which then serves as a reference point.

Figure 6A:
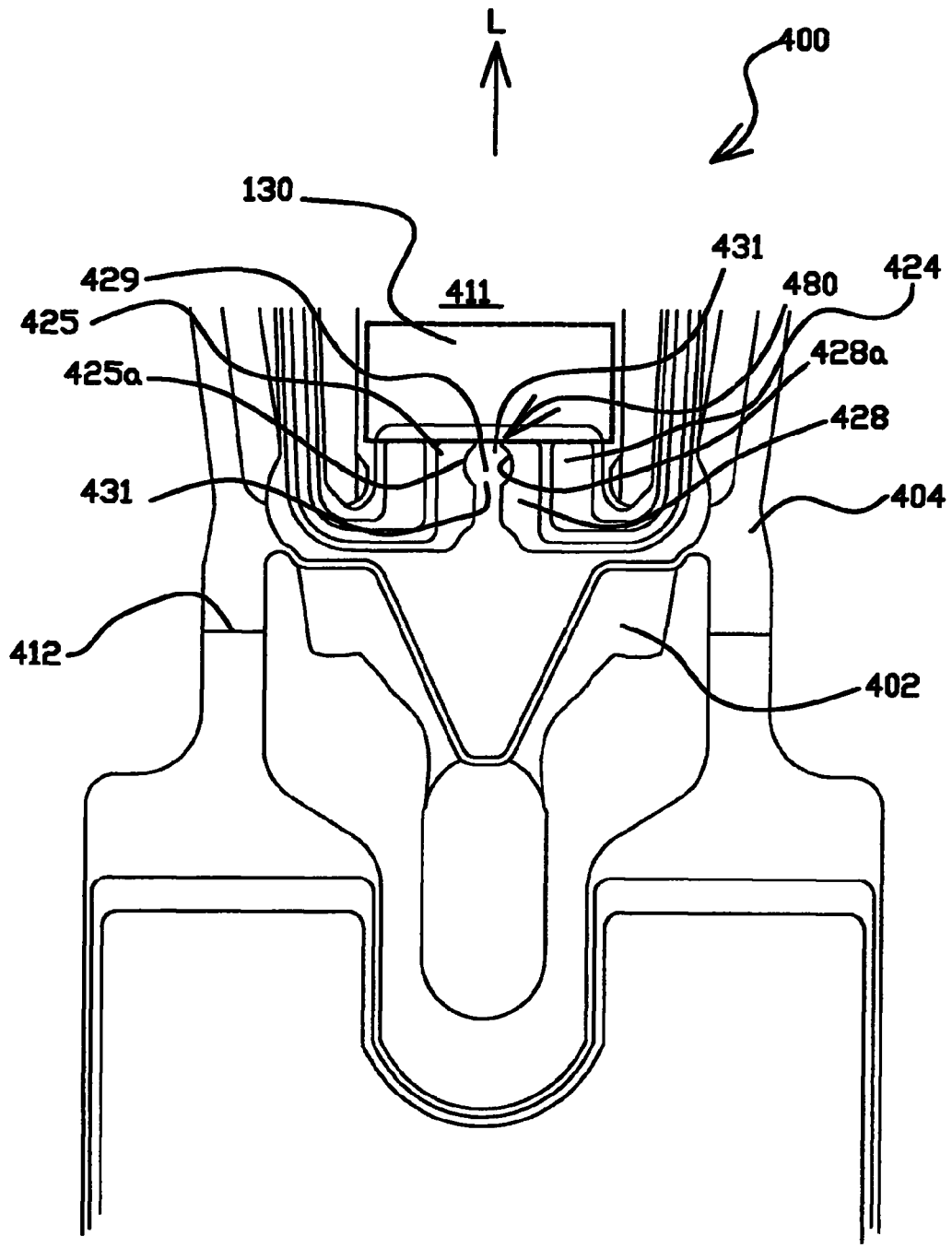
FIG. 6A is a detailed top view of a portion of a flexure and load beam showing a feature datum according to another embodiment of the present invention.

FIG. 6A illustrates a portion of a head suspension assembly 400 according to another embodiment of the present invention. Head suspension assembly 400 is in many respects similar to the head suspension assembly 100 of FIG. 2, so that like parts are given like numbering, although numbered from 400 onward. The head suspension assembly 400 includes a load beam 402, flexure 404, integrated leads 420 and bond pads 424 configured as generally described with reference to FIG. 2. The head suspension 400 includes a datum feature 480 formed by the edges of the bond pads 424. In the present example, first and second bond pads 425 and 428 are adjacent and spaced apart. First bond pad 425 has a first edge 425a facing second bond pad 428 and formed with a concave curved profile. Second bond pad 428 is provided with a second edge 428a facing bond pad 425 and is also formed with a concave curved profile. Curved edges 425a and 428a partially define a circle 429. The circle 429, however, is undefined at a pair of gaps 431 between the bond pad edges 425a, 428a.

Following installation of a head slider 130 to a slider mounting surface 411 on the flexure 404 (shown in dotted lines), the edges 425a and 428a of the bond pads 424 remain visible. Optical scanners as are known in the art may be employed to read the edges 425a and 428a and calculate the center of the circle 429, as described previously. The calculated center of the circle 429 then serves as a reference point. The gaps 431 introduce uncertainty into the reading of the circle 429 and the calculation of a center point. While the size of the gaps 431 may be reduced to more fully form the circle 429, the gaps 431 should not be eliminated, as doing so would electrically couple adjacent bond pads 425 and 428. As shown in the present example, gaps 431 are aligned along a longitudinal axis L of the head suspension 400. Any uncertainty in the reading of the circle 429 is therefore primarily along the L axis.

Figure 6B:
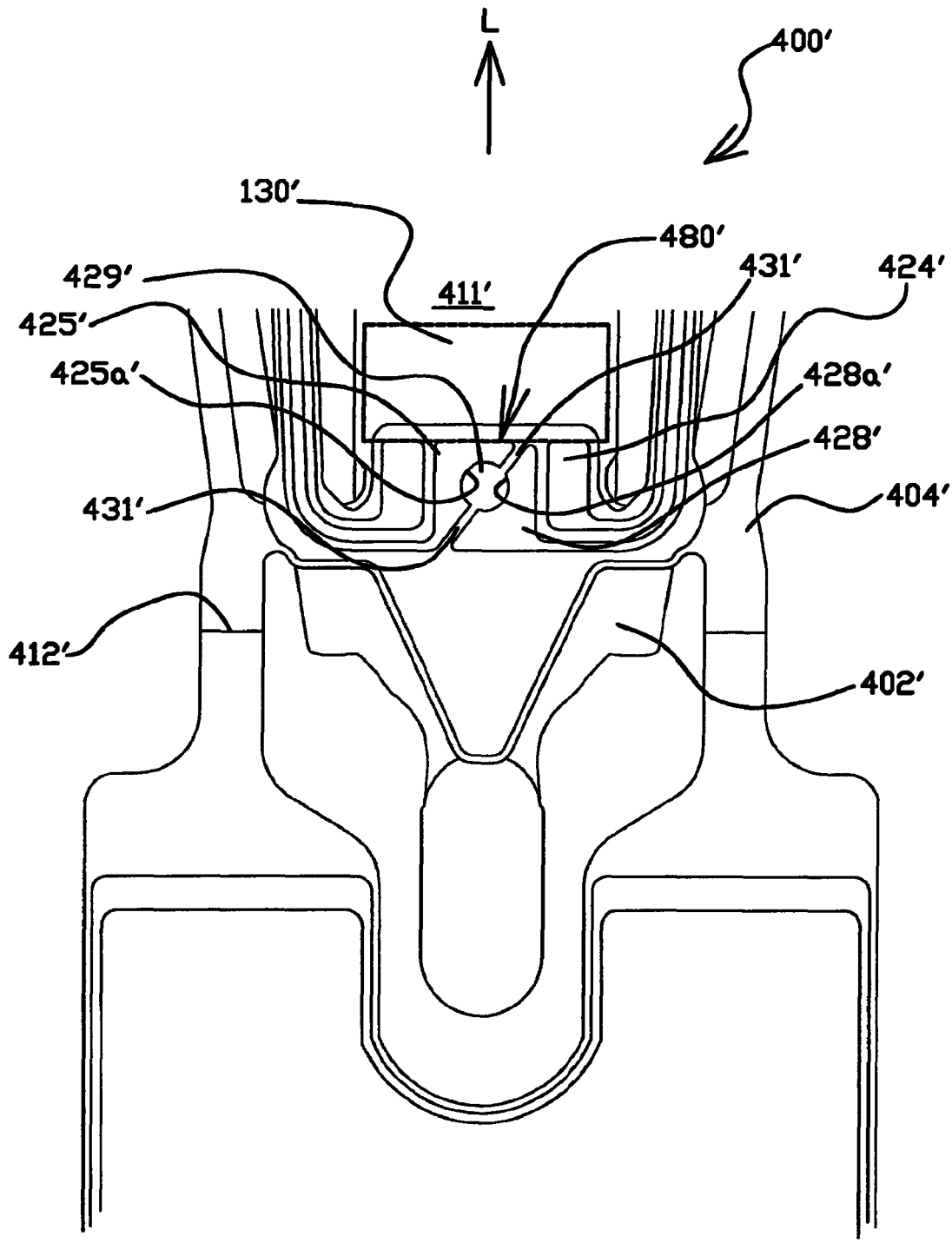
FIG. 6B is a detailed top view of the flexure and load beam of FIG. 6A in which the feature datum has an angular orientation.

FIG. 6B shows a head suspension assembly 400' according to another embodiment of the present invention. Head suspension assembly 400' is generally similar to the head suspension assembly 400 shown in FIG. 6A, such that like parts are given like numbering with the addition of the prime numeral. The head suspension assembly 400' includes a feature datum 480' in which edges of the bond pads 425', 428' are formed such that the gaps 431' are aligned at an angle with respect to the axis L. Any uncertainty in the reading of the circle 429' due to the gaps 431' is more evenly distributed along the L axis and a perpendicular or lateral axis, rather than solely along the L axis. While the embodiments illustrated in FIGS. 6A and 6B show the geometric shape formed by the adjacent bond pad edges 425a, 428a as circular, it is contemplated that additional shapes, such as ellipsoids and rectangles, would suffice as well.

Figure 7:
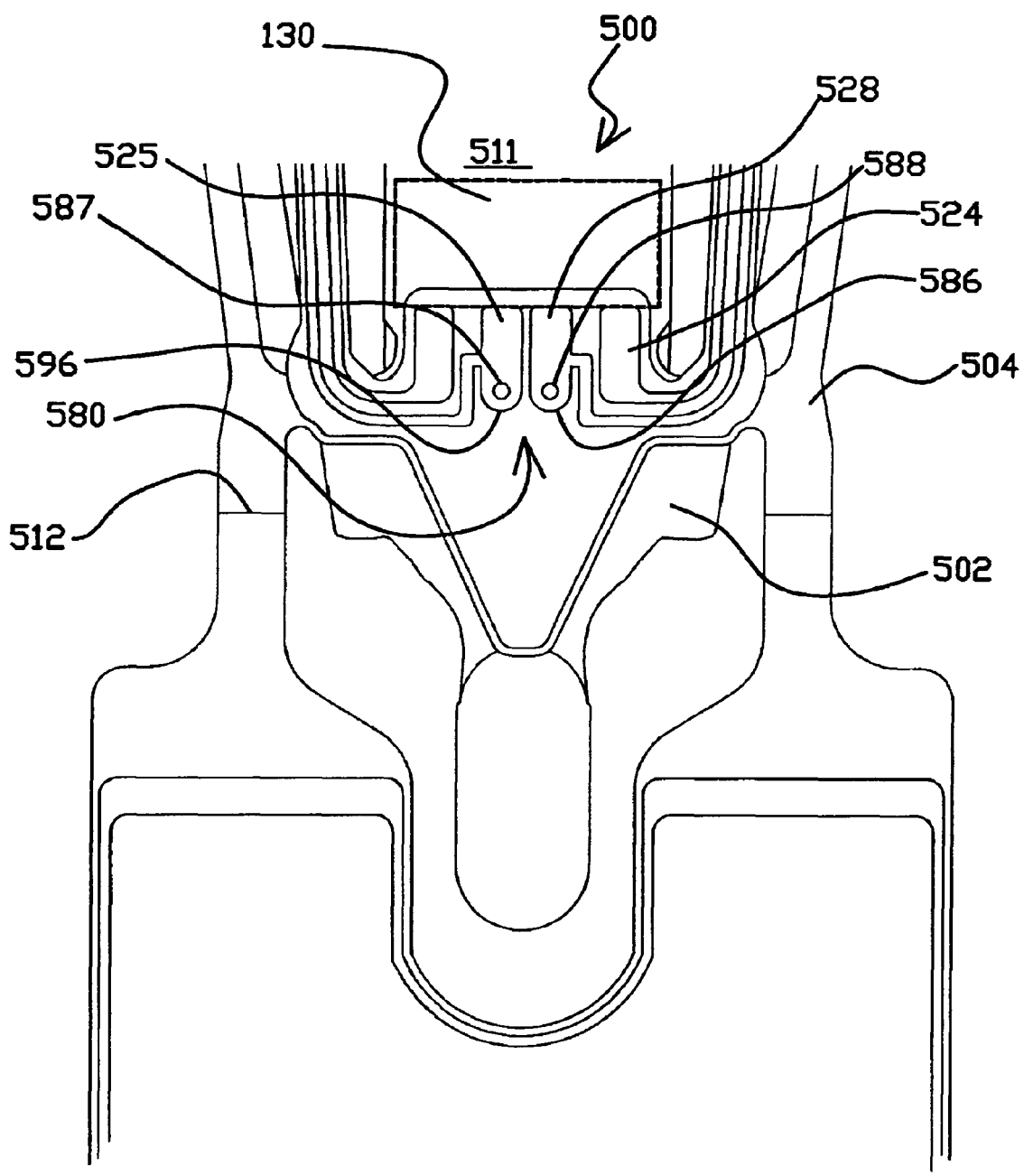
FIG. 7 is a detailed top view of a portion of a flexure and load beam showing a feature datum according to still another embodiment of the present invention.

FIG. 7 illustrates a portion of a head suspension assembly 500 according to another embodiment of the present invention. Head suspension assembly 500 is in many respects similar to the head suspension assembly 100 of FIG. 2, so that like parts are given like numbering, although numbered from 500 onward. The head suspension assembly 500 includes a load beam 502, flexure 504 and bond pads 524 configured as generally described with reference to FIG. 2. The head suspension 500 includes a datum feature 580 formed integrally with the bond pads 524. In the present example, adjacent bond pads 525 and 528 are provided with protrusions 596 and 586. Protrusions 596 and 586 are provided with circular apertures 587, 588 therethrough, respectively.

Following installation of a head slider 130 to a slider mounting surface 511 (shown in dotted lines), the apertures 587, 588 therethrough remain visible. Optical scanners may be employed to determine a middle point between the adjacent apertures 587, 588. The location of the middle point may then serves as a reference point for determining the location of components of the head suspension assembly 500, for example, of head slider 130 relative to a load point 183 (See FIG. 2).

Figure 8:
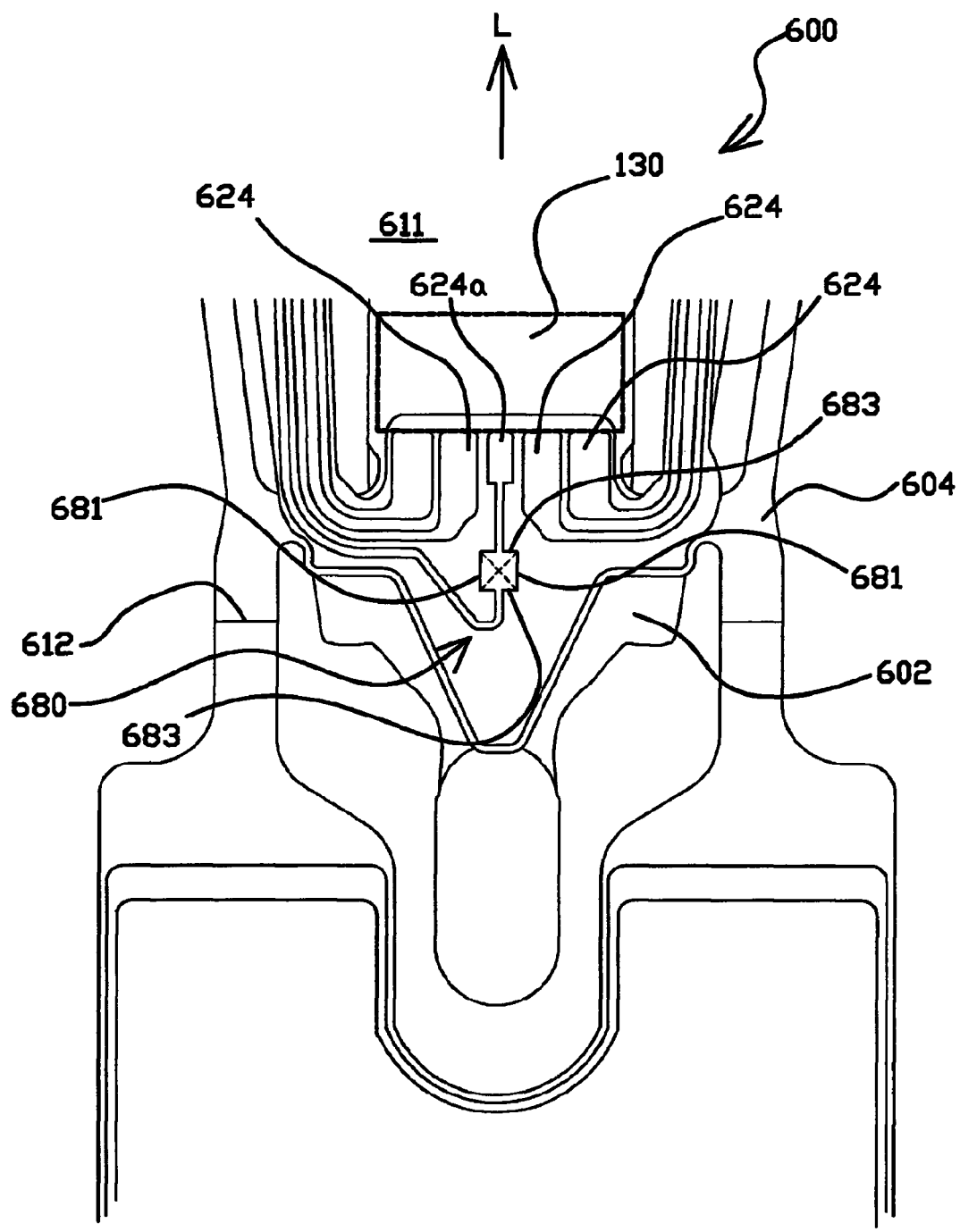
FIG. 8 is a detailed top view of a portion of a flexure and load beam showing a feature datum according to another embodiment of the present invention.

FIG. 8 illustrates a portion of a head suspension assembly 600 according to another embodiment of the present invention. Head suspension assembly 600 is in many respects similar to the head suspension assembly 100 of FIG. 2, so that like parts are given like numbering, although numbered from 600 onward. The head suspension assembly 600 includes a load beam 602, flexure 604 and bond pads 624 configured as generally described with reference to FIG. 2. The head suspension 600 is also shown with an additional center trace line 624a which may be a ground line, as is know in the art. The head suspension assembly 600 includes a feature datum 680 provided in a copper region bussed to or formed from the center trace 624a. Feature datum 680 is rectangle-shaped and has side edges 681 and opposing end edges 683. Vision scanning devices may be used to identify the edges 681 and 683 to generate reference points. For example, the intersection of representative diagonal lines extending from the corners of the feature datum 680 (shown in dashed lines) may serve as a reference point. Alternately, the intersection of a representative mid-line between opposing edges 681 and end edge 683 may serve as a reference point, similar to that described with respect to FIGS. 5A and 5B.

Figure 9:
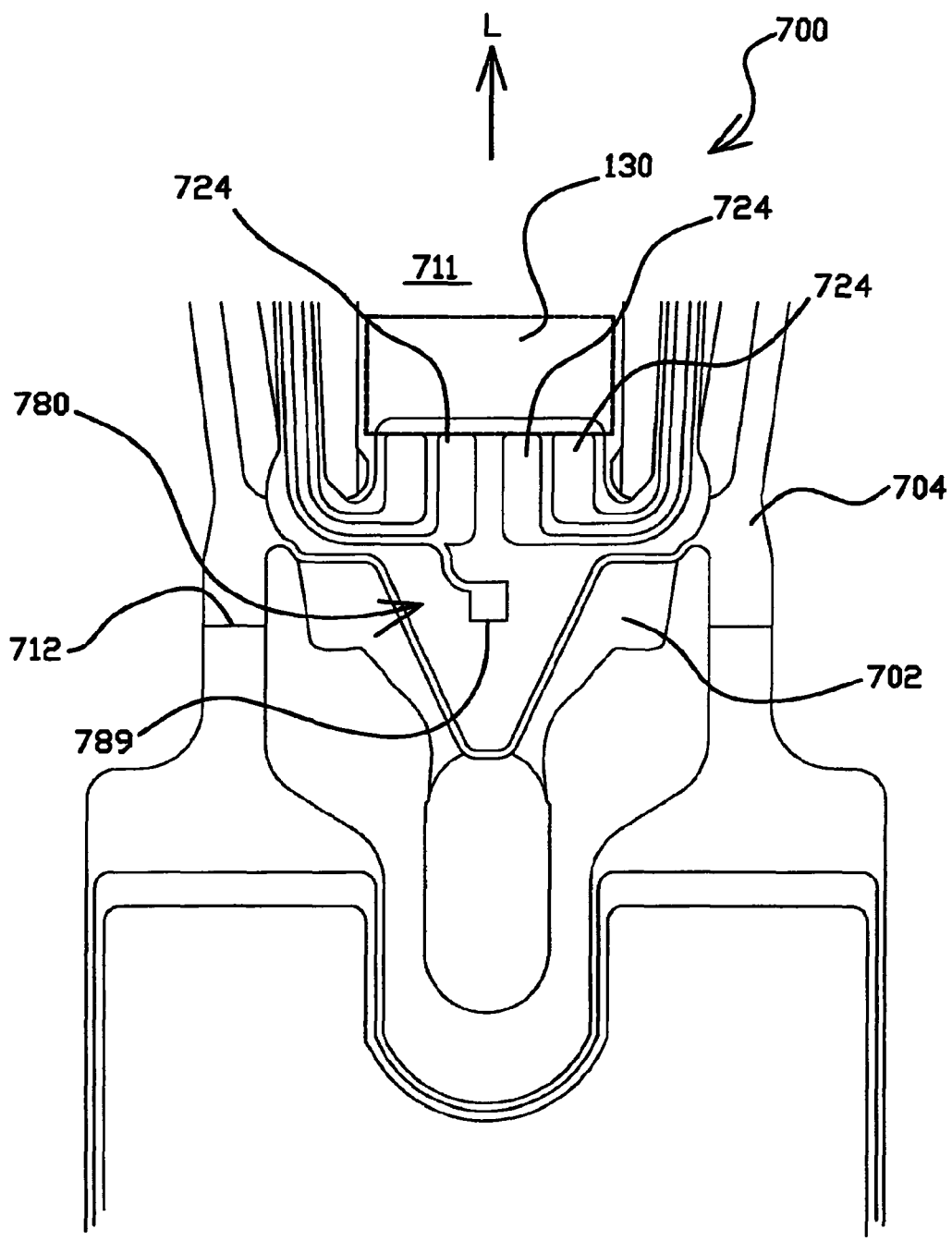
FIG. 9 is a detailed top view of a portion of a flexure and load beam showing a feature datum according to another embodiment of the present invention.

FIG. 9 illustrates a portion of a head suspension assembly 700 according to another embodiment of the present invention. Head suspension assembly 700 is in many respects similar to the head suspension assembly 100 of FIG. 2, so that like parts are given like numbering, although numbered from 700 onward. The head suspension assembly 700 includes a load beam 702, flexure 704 and bond pads 724 configured as shown generally in FIG. 2. The head suspension 700 includes a feature datum 780 provided in a copper region adjacent the bond pads 724. The feature datum 780 is bussed to or formed integrally with a trace line 720. The feature datum 780 includes a copper protrusion 789 extending from the trace line 720.

Figure 10:
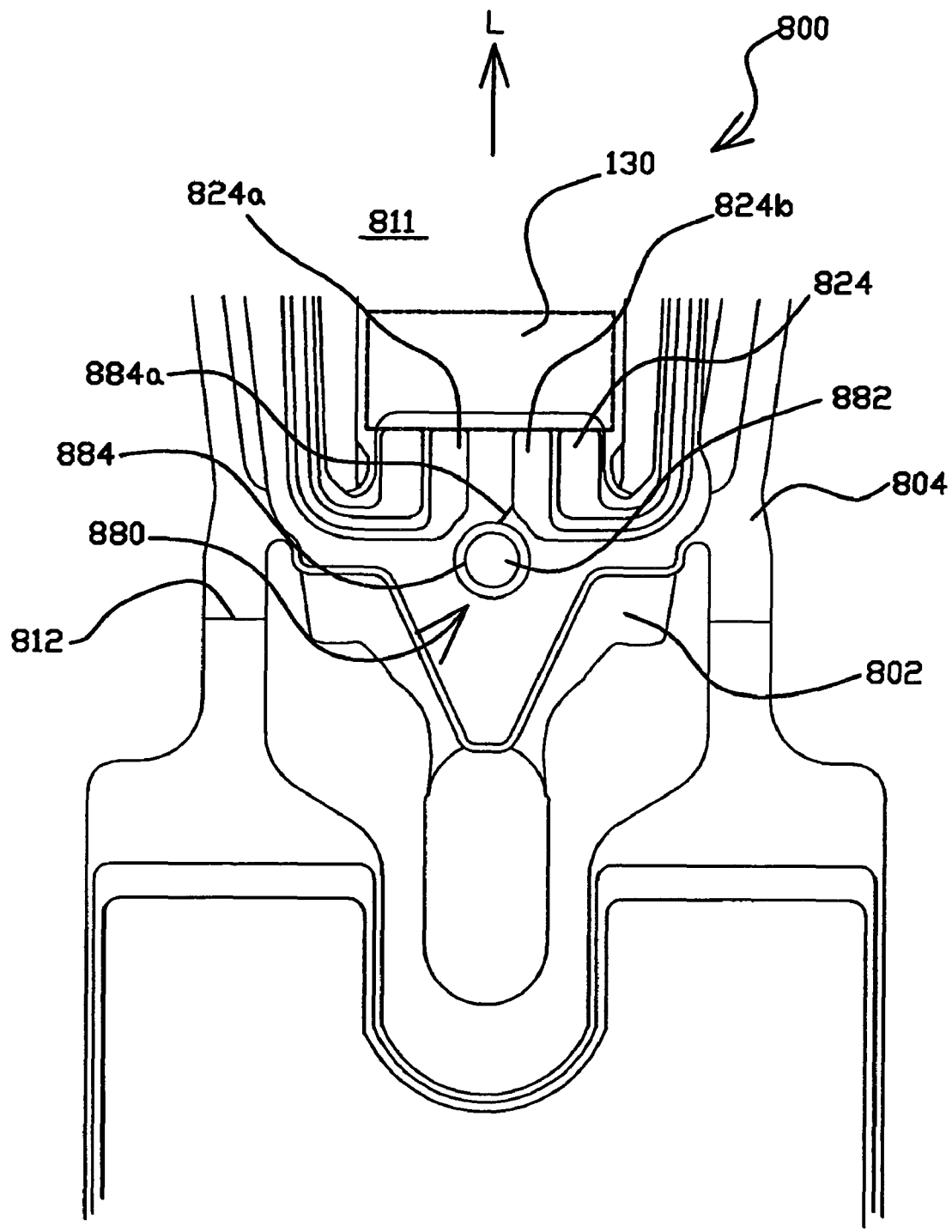
FIG. 10 is a detailed top view of a portion of a flexure and load beam showing a feature datum according to another embodiment of the present invention.

FIG. 10 shows another embodiment of a head suspension assembly including a feature datum in accordance with the present invention. Head suspension assembly 800 is in many respects similar to the head suspension assembly 100 of FIG. 2, so that like parts are given like numbering, although numbered from 800 onward. The feature datum 880 includes an aperture 882 extending through the flexure 804 at a copper region 884. As described previously with respect to the alignment structure 140 of FIG. 2, the aperture 882 includes an opening through the stainless steel of the flexure 804 and an opening through a layer of copper formed on the flexure 804. The opening through the stainless steel is larger than the opening through the copper such that the edges of the aperture 882 are defined by copper. The feature datum 880 is preferably positioned approximately equidistant between adjacent bond pads 824a and 824b. The copper region 884 is electrically connected to or bussed to bond pad 824 via a bus 884a.

Feature datum 880 is generally similar to that the feature datum 180 shown generally in FIG. 2, and remains visible following installation of a head slider 130 to a slider mounting surface 811 on the flexure 304 (shown in dotted lines). However, feature datum 880 is electrically coupled to bond pad 824 via the bus 884a. This electrical interconnection facilitates an electro-plating process that may be used to deposit gold onto the copper region as is known in the art. According to the present example, an electrical current applied to the integrated leads 820 and bond pads 824 for the purpose of electro-plating will also be applied to the datum feature 880. It is not necessary to apply a separate electrical current to the feature datum 880, as would be necessary were the feature datum 880 electrically isolated from the remaining copper features as is the feature datum 180 shown generally in FIG. 2.

Although the present invention has been described with reference to preferred embodiments, those skilled in the art will recognize that changes can be made in form and detail without departing from the spirit and scope of the invention.

What is claimed is:

1. A method of manufacturing a head suspension assembly for supporting a head slider over a storage media in a dynamic storage device of the type having a spring metal layer, an electrically conductive layer, and a dielectric layer interposed between the metal layer and the electrically conductive layer, and a plurality of traces formed in the electrically conductive layer and terminating in bond pads adjacent a slider mounting surface, the method comprising the steps of:

forming a datum feature in the electrically conductive layer adjacent to the bond pads and spaced apart from the slider mounting surface;

installing the head slider at the slider mounting surface;

determining the coordinates of the head slider relative to the datum feature; and discarding the head suspension assembly if the coordinates of the head slider are not within preset ranges.

2. The method of claim 1 further comprising the step of optically reading the datum feature to determine the coordinates of the datum feature.

3. The method of claim 1:

wherein the datum feature is formed with a predetermined geometric shape, and further comprising employing an optical scanner to locate at least one edge of the datum feature.

4. The method of claim 1 further comprising the steps of:

forming a first bond pad with a first concave edge;

forming a second bond pad adjacent the first bond pad with a second concave edge, so that the first edge and the second edge partially define the datum feature which has a circular shape; and employing optical scanners to determine a center of the datum feature in relation to the location of the first and second edges.

\* \* \* \* \*